United States Patent [19]
Breads

[11] 3,898,683
[45] Aug. 5, 1975

[54] APPARATUS FOR PHOTOGRAPHING DENTAL STUDY MODELS

[75] Inventor: Peter R. Breads, Buffalo, N.Y.

[73] Assignee: Great Lakes Orthodontic Laboratory Inc., Buffalo, N.Y.

[22] Filed: Aug. 13, 1973

[21] Appl. No.: 388,032

[52] U.S. Cl. ............................................. 354/292
[51] Int. Cl. ........................................... G03b 15/00
[58] Field of Search ................... 95/1.1, 85; 355/39; 352/54, 88; 354/292

[56] References Cited
UNITED STATES PATENTS

| | | | |
|---|---|---|---|
| 2,054,414 | 9/1936 | Fleischer | 352/88 |
| 2,185,508 | 1/1940 | Kunze | 95/1.1 |
| 2,235,355 | 3/1941 | Brown | 355/39 |
| 2,346,096 | 4/1944 | Whitaker | 95/85 |

*Primary Examiner*—John M. Horan
*Attorney, Agent, or Firm*—Christel & Bean

[57] ABSTRACT

Apparatus for making photographic records of dental study models comprising a frame, a multiple exposure camera adjustably connected to the frame, and supporting means on the frame spaced from the camera and including a plurality of supporting elements in the form of horizontally disposed shelf members arranged in spaced relation along a surface in the field of view of the camera. A plurality of different photographic views of a study model can be made on a single photographic record member such as a film or plate by placing the model successively in different orientations on the supporting shelf members and taking corresponding successive exposures with the camera.

10 Claims, 4 Drawing Figures

PATENTED AUG 5 1975 3,898,683

SHEET 1

3,898,683

APPARATUS FOR PHOTOGRAPHING DENTAL STUDY MODELS

BACKGROUND OF THE INVENTION

This invention relates to the art of photographic apparatus, and more particularly to a new and improved photographic apparatus for dental use.

Dental study models comprising three dimensional structures formed from impressions taken on suitable material from a patient's mouth are widely used by dentists and orthodontists for study, diagnosis and planning of treatment procedure. Being three dimensional, these models can give rise to a considerable storage problem where a large number of patient histories are involved. In addition, by their nature and shape the models provide little if any space or area for the dentist or orthodontist to apply markings or other graphic illustrations on the model to illustrate the problem and solution. Furthermore, frequent handling of the models increases the probability of their breakage.

SUMMARY OF THE INVENTION

It is, therefore, an object of this invention to provide a new and improved apparatus for making photographic records of dental study models.

It is a further object of this invention to provide such apparatus capable of making a plurality of photographic views of a dental study model on a single photographic record member.

It is an additional object of this invention to provide such apparatus which is simple in construction and operation and economical to manufacture and maintain.

The present invention provides apparatus for making photographic records of dental study models comprising frame means, a multiple exposure camera on the frame means, and supporting means on the frame means spaced apart from the camera and including a plurality of supporting elements arranged in spaced relation along a surface in the field of view of the camera. A plurality of different photographic views of a study model are made on a single photographic record member by placing the model successively in different orientations on the supporting elements and taking corresponding successive exposures with the camera.

BRIEF DESCRIPTION OF THE DRAWING FIGURES

DETAILED DESCRIPTION OF THE ILLUSTRATED EMBODIMENT

Figure 1:
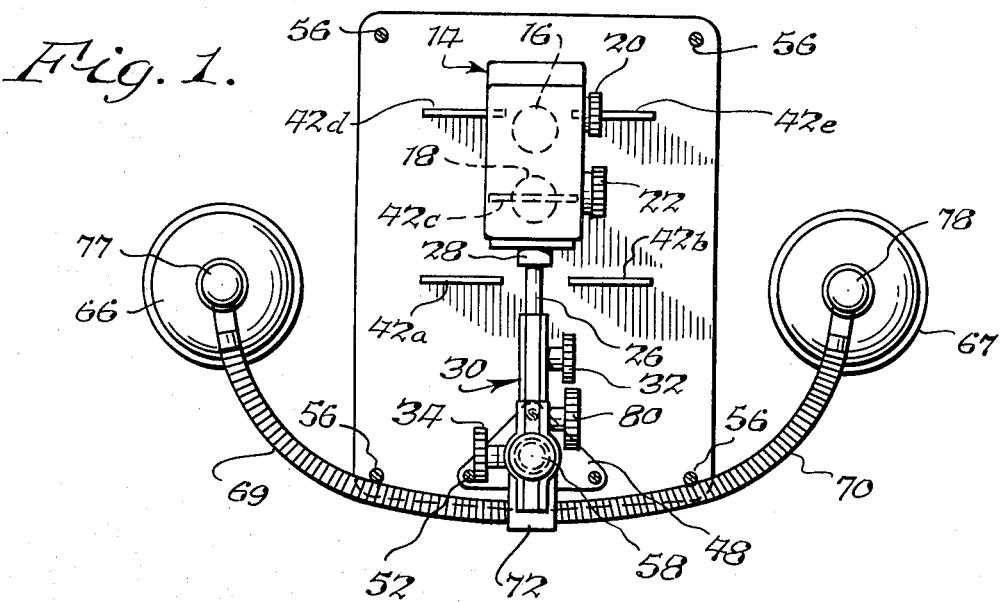
FIG. 1 is an end elevational view of the apparatus according to the present invention.
Figure 1:
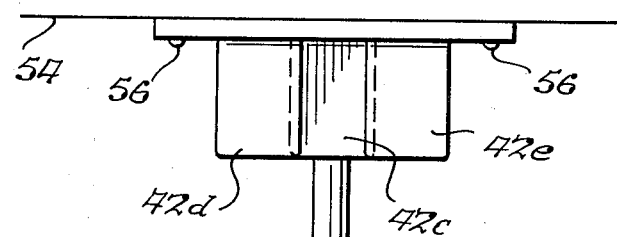
Figure 2:
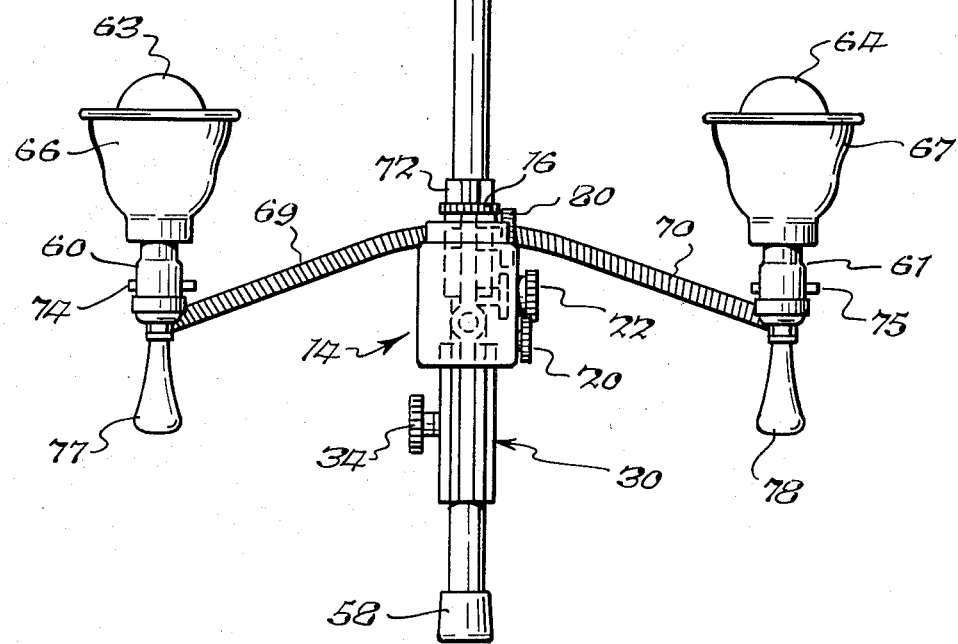
FIG. 2 is a top plan view of the apparatus according to the present invention.
Figure 3:
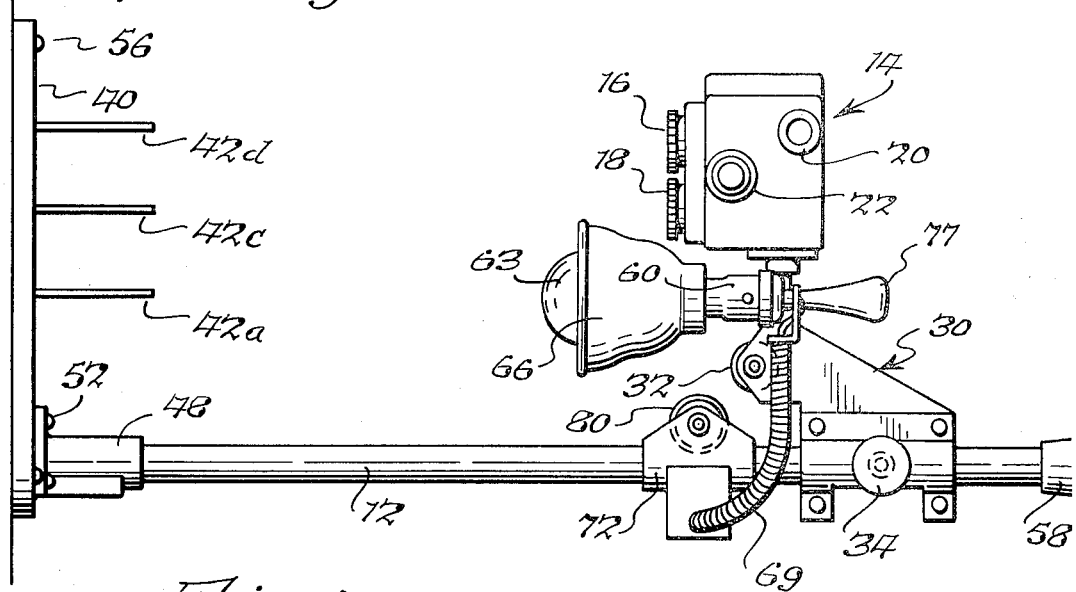
FIG. 3 is a side elevational view of the apparatus according to the present invention.

Referring now to FIGS. 1–3, the apparatus of the present invention comprises frame means comprising an elongated body member 12 which preferably is tubular in form to provide strength and lightness in serving as a support for the operating parts of the apparatus. The apparatus of the present invention further comprises a multiple exposure camera generally designated 14 connected to the frame 12. Camera 14 includes a viewfinder lens 16, a picture-taking lens 18, and various controls such as a film winding knob 20 and a lens focusing knob 22. Camera 14 is of the multiple exposure type wherein a plurality of exposures can be taken on a single frame of the photographic film or on a single photographic plate. One preferred form of camera 14 is available commercially from Yashika Co. Ltd. under the model designation Yashica D-66 wherein the film includes 12 frames and four exposures per frame can be taken.

Camera 14 is adjustably connected to body member 12 in the following manner. Camera 14 is supported by a member 26 in the form of a rod or tube secured at one end thereof to camera 14, preferably at the base of the camera such as by means of a fitting or connector 28 which receives the end of member 26. Member 26 is slidably received in a portion of a carriage bracket 30 which is provided with a locking means in the form of a clamping screw having a manually operable knob 32 by means of which rod 26 can be fixed in any desired vertical position thereof. Bracket 30 is formed to slidably engage the outer surface of tube 12 for longitudinal adjustment therealong and is provided with a second locking means or clamping screw having a manually operable knob 34 by means of which bracket 30 may be rigidly but adjustably secured in position along tube 12. By virtue of this arrangement, camera 14 can be adjusted both vertically and horizontally, as will be described in detail presently.

The apparatus of the present invention further comprises supporting means 40 on frame means 12 and spaced from camera 14, the supporting means including a plurality of supporting elements 42a–42e arranged in spaced relation along a surface in the field of view of camera 14. In particular, supporting means 40 comprises a solid member preferably of opague material and of black or similar dark color to serve as an effective photographic background for relatively light-colored objects. Member 40 preferably is flat or planar and is disposed in a plane substantially perpendicular and intersecting the axis of camera lens 18. In other words, element 40 is positioned forwardly of the lens of camera 14. The axis of the camera lens is of course the optical axis as is readily apparent to those skilled in the art. Each of the supporting elements 42 in preferred form comprises a solid shelf-like member extending from member 40 at substantially a right angle thereto. The apparatus is positioned during use so that the supporting elements or shelf members 42 are disposed substantially horizontally. In a preferred form of the present invention, five supporting elements 42a–42e are arranged in spaced relation along a plane substantially perpendicular to the optical axis of the lens of camera 14. The supporting elements or shelf members 42a–42e are arranged in a plurality of rows spaced along member 40, there being at least one shelf member in each of the rows. In particular, supporting elements 42a and 42b are disposed in spaced relation in a first row along a common horizontal plane, element 42c is spaced vertically upwardly from these elements substantially medially thereof in a second row, and then elements 42d and 42e are spaced further vertically upwardly from the other elements along a third row in a common horizontal plane and in generally vertical alignment with elements 42a and 42b.

Supporting member 40 is secured to the end of body member 12 by means of a bracket 48 having a tubular portion for receiving the end of tube 12 and a planar portion which is mounted to supporting element 40 by suitable fastening means such as screws 52. As a result, supporting member 40 is disposed in a plane perpendicular to the axis of tube 12. Supporting member 40, in turn, is adapted to be mounted to a supporting surface, such as a wall designated 54, in FIGS. 2 and 3, by suitable means such as fastening screws 56. The opposite end of tube 12 can be fitted with a cap member 58 so as to cover the open end thereof.

The apparatus of the present invention further comprises means to illuminate the study models being photographed and in the form of a pair of conventional electric lamps carried by frame means 12. In particular, a pair of electric sockets 60 and 61 carry two electric lamps 63 and 64, respectively, and corresponding reflectors 66 and 67, the lamp and reflectors being disposed toward supporting means 40, and sockets 60 and 61 are connected by flexible sleeves 69 and 70, respectively, to a carriage bracket 72 slidably connected on tube 12. Electrical power is supplied to lamps 63, 64 through suitable cords (not shown) received in sleeves 69, 70 and which merge in a common cord (not shown) which can be plugged into a nearby electrical outlet. Sockets 60 and 61 are provided with conventional on-off switches designated 74 and 75, respectively, and a pair of knobs or handles 77 and 78 are secured to sockets 60 and 61, respectively. Carriage bracket 72 is formed to slidably engage the outer surface of tube 12 for longitudinal adjustment therealong and is provided with a locking means or clamping screw 80 having a manually operable knob by means of which bracket 72 may be rigidly but adjustably secured in position along tube 12. By virtue of this arrangement, the distance between lamps 63, 64 and supporting means 40 can be adjusted by means of bracket 72 and clamping screw 80, and the direction of light emitted by lamps 63, 64 can be changed by means of knobs 77, 78 and flexible sleeves 69, 70.

The apparatus of the present invention is operated to make photographic records of dental study models in the following manner. Dental study models are formed according to conventional procedures which are readily known to those skilled in the art so that a detailed description thereof is believed to be unnecessary. Suffice it to say, the dentist or orthodontist takes an impression of a patient's teeth by having the patient bite into a suitable material capable of retaining an impression and then this material is used as a mold to form a model of plaster or equivalent material. The model thus provides a facsimile of the jaw of a patient including the front teeth, the side teeth or molars, and in the case of the upper jaw of the patient the palatal surface portion. Generally, study models of both the upper jaw and of the lower jaw are formed for a patient.

With the apparatus of the present invention, a plurality of different photographic views of a dental study model are made on a single photographic record member such as a film or plate by placing the model successively in different orientations on the supporting elements 42a–42e and taking corresponding successive exposures with camera 14. In particular, the upper and lower jaw parts of a study model are placed on shelf members 42a and 42b, each model part being disposed and supported on its shelf member with the biting surfaces of the teeth toward camera 14 thereby providing a plan view of each part. Preferably, both parts are placed on shelf members 42a and 42b and a single exposure of both parts is taken with camera 14, although this could be done separately with two exposures taken by camera 14. Next, the two model parts are placed one on top of the other with the teeth in contact on shelf member 42c simulating the upper and lower teeth of the patient in biting relationship. The model is disposed so that the center or middle point of the set of front teeth is closest to camera 14, and another exposure is taken with camera 14 on the same frame of the film or on same photographic plate. The next photographic view is taken with the model parts in the same biting relationship as in the previous view but rotated in one direction through a relatively small angle, for example about 45°. The model is supported on shelf member 42d and an exposure is taken with camera 14. The last view is taken with the model supported on shelf member 42e in a similar manner but with the model rotated in the opposite direction from the position on the shelf member 42c through the same small angle such as 45°.

While the foregoing exposures or views are being taken, lamps 63 and 64 are turned on and suitably disposed so as to illuminate the model in the various positions or locations. In addition, it may be necessary in some cases to adjust the vertical position of camera 14 using knob 32 as the exposures are taken depending upon such factors as the specifications of camera 14 and vertical spacing between the supporting elements 42. The distance between camera 14 and supporting means 40 generally will remain fixed for a particular camera, but this distance can be changed if necessary by means of knob 34 such as might be required if a different camera is substituted.

After the foregoing sequence of exposures, camera 14 is prepared for making the next print of another study model such as by removing the exposed photographic plate and substituting a new one or, as in the present illustration, by manipulating knob 20 to advance the film to the next frame.

As previously described, supporting member 40 can be mounted to a wall 54 in a convenient location in the office or laboratory where the apparatus is used. While the functional relationships of the various elements remain the same, the apparatus can assume different forms or assemblies without departing from the spirit and scope of the present invention. For example the apparatus could be incorporated in a suitcase or similar handcarried receptacle, with the camera being on the inside surface of the cover or lid and the supporting elements being on the inside surface of the base or bottom of the receptacle.

Figure 4:
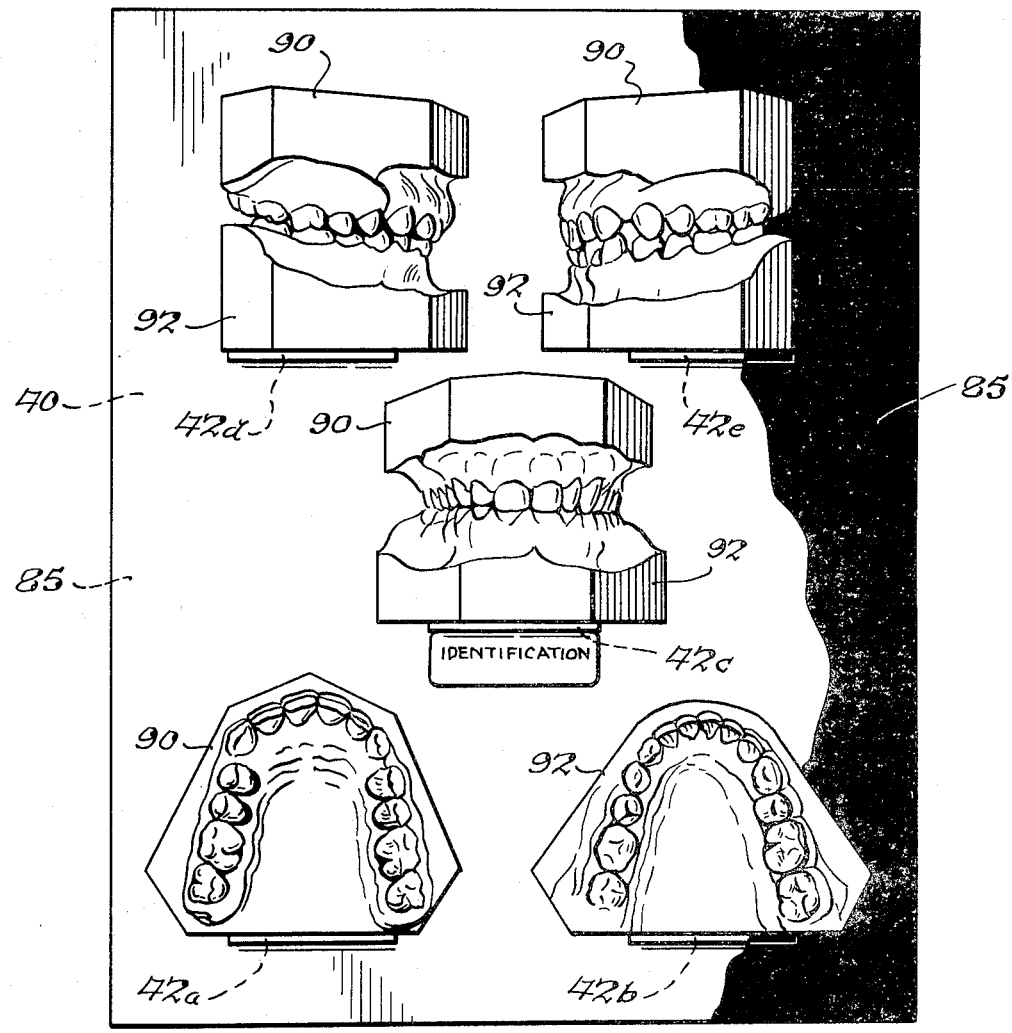
FIG. 4 is an elevational view of a photographic record of a dental study model made by the apparatus of the present invention.

FIG. 4 shows a completed print 85 produced by the apparatus of the present invention according to the foregoing procedure. Print 85 preferably has a black background which is provided by the black surface of supporting member 40, and for convenience in illustration only a portion of the background of print 85 is shown dark or black, the rest being light or white as designated by the broken lead line from numeral 85. It is to be understood that the rest of the background of print 85 is preferably dark or black.

Because the background of print 85 and the location of the views thereon are defined by supporting means 40 and supporting elements 42a–42e, the background of print 85 is designated also by the reference numeral 40' with a broken lead line and the locations of the shelf members are indicated by the reference numerals 42a'–42e' likewise with broken lead lines. In a finished print 85, due to the darkness of the background or to photographic touch-up procedures, the shelf members will not appear.

Thus a completed print 85 according to a preferred mode of the present invention includes plan views of the upper and lower model parts in the lower left-hand and right-hand portions of the print, and a frontal elevational view of the two model parts placed together simulating the position of the teeth in biting relationship is located in the central region of the print. This view shows all the upper and lower front teeth of the patient. The print includes two other views in the upper left-hand and right-hand portions showing the model as in the center view but rotated in opposite directions through angles of about 45°. The left-hand view illustrates the upper and lower teeth on the right side of the patient's jaw, and the right-hand view shows the upper and lower teeth on the left side of the patient's jaw. By way of example, the patient's identification is provided under the center view in FIG. 4. The foregoing number and location of views is preferred, but these can of course be changed without departing from the spirit and scope of the present invention. Likewise, the number and location of the supporting elements 42 on supporting means 40 are determined by the desired number and relative location of views on a completed print, and the number and location of supporting elements 42 can be changed without departing from the spirit and scope of the present invention.

The apparatus of the present invention thus provides a photographic record of a dental study model in the form of a plurality of photographic views of the dental study model on a single photographic record member. In particular, print 85 of FIG. 4 is a black and white high contrast photograph illustrating five views of the study model, actual size, allowing for measurement and diagnosis. Print 85 can be filed with the patient history, treatment plan and X-rays in the patient chart. Together with the study model, print 85 gives the dentist and orthodontist both a two-dimensional and three dimensional record of the patient's mouth. Print 85 provides ample room to write and draw illustrations of the problem and solution with a wax pencil or similar writing implement. Consultations are simplified due to the ease with which print 85 is filed, and the print provides a fast reference during telephone discussions. Print 85 enables convenient transportation of case histories to conferences. With the photographic record of the study model being provided by print 85, the study model can be stored in an out-of-the way or convenient place thereby saving office space. Print 85 allows for less handling of the study model thereby minimizing or eliminating the possibility of breakage. Also, print 85 allows the study model to be left unpolished. Duplicate prints may be prepared if needed, to be given to the referring dentist as a record of the case history, and to the patient to explain the treatment procedure. The foregoing advantages are provided by apparatus which is simple in construction and operation and economical to manufacture and maintain.

The present invention thus accomplishes its intended objects. While a single embodiment of the present invention is described in detail, this is for the purpose of illustration, not limitation.

I claim:

1. Apparatus for making photographic records of three dimensional dental study models comprising:
   a. frame means;
   b. a multiple exposure camera connected to said frame means;
   c. supporting means on said frame means and spaced from said camera, said supporting means comprising a planar background element disposed in a plane perpendicular to the optical axis of said camera and a plurality of supporting elements on said background element arranged in a plurality of rows spaced along the surface of said element facing said camera in the field of view of said camera, there being at least one supporting element in each of said rows, each supporting element being adapted to hold a three dimensional study model manually placed thereon and to hold a three dimensional study model in different orientations thereon; and
   d. adjustable means connecting said camera to said frame means in a manner allowing selective movement of said camera in a direction generally parallel to the plane of said background element and from row to row relative to said supporting elements;
   e. whereby a plurality of different photographic views of a study model are made on a single photographic record member by manually placing the model successively in different orientations on successive ones of said supporting elements and taking corresponding successive exposures with said camera.

2. Apparatus according to claim 1, wherein said supporting elements comprise shelf members extending from said background member toward said camera.

3. Apparatus according to claim 2, wherein said background element is solid and of substantially opaque material.

4. Apparatus according to claim 1 wherein said background element is solid and of substantially opaque material.

5. Apparatus according to claim 1, further including illuminating means connected to said frame means to illuminate said supporting means.

6. Apparatus according to claim 5, further including means to adjustably connect said illuminating means to said frame means.

7. Apparatus according to claim 1, wherein each of said supporting elements is generally planar and is disposed generally horizontally when the apparatus is in a position of use.

8. Apparatus according to claim 7, wherein said horizontally disposed supporting elements extend from said supporting member toward said camera.

9. Apparatus for making photographic records of three dimensional dental study models comprising:
   a. frame means;
   b. a multiple exposure camera on said frame means;
   c. supporting means on said frame means and spaced from said camera, said supporting means comprising a planar background element disposed in a plane generally perpendicular to the optical axis of said camera and a plurality of shelf members extending from said background element toward said camera, said shelf members being arranged in a plurality of rows spaced along said background element, there being at least one shelf member in each of said rows, each of said shelf members being disposed generally horizontally when the apparatus is in a position of use;

d. adjustable means connecting said camera to said frame means in a manner allowing selective movement of said camera in a direction generally parallel to the plane of said background element and from row to row relative to said shelf members; and e. illuminating means connected to said frame means to illuminate said supporting means;

f. whereby a plurality of different photographic views of a study model are made on a single photographic record member by manually placing the model successively in different orientations on successive ones of said shelf members and taking successive exposures with said camera.

10. Apparatus according to claim 9, further including means to adjustably connect said illuminating means to said frame means for adjusting the direction of illumination onto said supporting means and the distance between said illuminating means and said supporting means.

* * * * *